(12) United States Patent
Das et al.

(10) Patent No.: US 9,421,634 B2
(45) Date of Patent: Aug. 23, 2016

(54) SYSTEM AND METHOD FOR PERFORMING RESISTANCE SPOT WELDING

(71) Applicants: Manohar Das, Rochester Hills, MI (US); Vernon Fernandez, Rochester Hills, MI (US); John Paille, Rochester Hills, MI (US); Douglas P Gouin, Lakeshore, CA (US)

(72) Inventors: Manohar Das, Rochester Hills, MI (US); Vernon Fernandez, Rochester Hills, MI (US); John Paille, Rochester Hills, MI (US); Douglas P Gouin, Lakeshore, CA (US)

(73) Assignee: FCA US LLC, Auburn Hills, MI (US)

( * ) Notice: Subject to any disclaimer, the term of this patent is extended or adjusted under 35 U.S.C. 154(b) by 731 days.

(21) Appl. No.: 13/671,633

(22) Filed: Nov. 8, 2012

(65) Prior Publication Data
US 2013/0186868 A1   Jul. 25, 2013

Related U.S. Application Data

(60) Provisional application No. 61/557,474, filed on Nov. 9, 2011.

(51) Int. Cl.
*B23K 11/24*  (2006.01)
*B23K 11/25*  (2006.01)
*B23K 11/11*  (2006.01)

(52) U.S. Cl.
CPC .............. *B23K 11/24* (2013.01); *B23K 11/115* (2013.01); *B23K 11/241* (2013.01); *B23K 11/257* (2013.01)

(58) Field of Classification Search
CPC combination set(s) only.
See application file for complete search history.

(56) References Cited

U.S. PATENT DOCUMENTS

| 4,387,289 | A | * | 6/1983 | Nakata et al. | 219/110 |
| 4,497,994 | A | * | 2/1985 | Flemm et al. | 219/109 |
| 4,596,917 | A | | 6/1986 | Nied et al. | |
| 4,885,451 | A | * | 12/1989 | Farrow et al. | 219/110 |
| 6,064,029 | A | * | 5/2000 | Choi et al. | 219/110 |
| 6,130,396 | A | | 10/2000 | Hasegawa et al. | |
| 6,208,146 | B1 | * | 3/2001 | Huang et al. | 324/421 |
| 6,320,774 | B2 | * | 11/2001 | Jochi et al. | 363/98 |
| 7,244,905 | B2 | | 7/2007 | Das et al. | |

OTHER PUBLICATIONS

Xingqian Chen et al. "Modeling and Fuzzy Control of the Resistance Spot Welding Process" SICE Jul. 1997.

* cited by examiner

*Primary Examiner* — Dana Ross
*Assistant Examiner* — Renee L Larose
(74) *Attorney, Agent, or Firm* — Ralph E. Smith

(57) ABSTRACT

A probeless energy delivery controller for a resistance spot welding system includes a power supply module that generates a first current and a power delivery module configured to generate a second current from the first current. The current is delivered to a first electrode and a second electrode that have at least two weld pieces interposed there-between. As the current flows through the weld pieces, the resistance and temperature of the weld pieces increase such that the weld pieces melt. The system further includes a voltage control module that receives a current reading indicating a value of the second current, estimates a resistance of the weld pieces based on the value of the second current, and determines a phase angle for setting a voltage outputted by the power supply module based on the estimated resistance and a power profile. The power supply module generates the first current based on the phase angle.

11 Claims, 5 Drawing Sheets

SYSTEM AND METHOD FOR PERFORMING RESISTANCE SPOT WELDING

CROSS REFERENCE TO RELATED APPLICATION

This application claims the benefit of U.S. Provisional Ser. No. 61/557,474, filed Nov. 9, 2011.

FIELD OF THE INVENTION

The present disclosure relates to a resistance spot welding system used in the fabrication of sheet metal structures. More specifically, this disclosure relates to a probeless energy delivery controller for resistance spot welding.

BACKGROUND

In a resistance spot welding process, a pair of electrodes forcibly clamps at least two weld pieces comprised of metal materials together and a current is applied to the weld pieces via the electrode tips. As the current flows, the temperature of the weld pieces increases until the inherent melting point of the weld pieces, at which point the weld pieces are forged together and a weld is formed.

Previously, the processes of spot welding utilized control methods that included constant current, constant voltage, constant heat, and other methods. In the constant voltage and constant current method, the voltage or current are kept constant for the duration of the weld period, thereby resulting in an excess amount of heat being supplied to the weld zone. In the constant heat method, a linear power curve controls the welding process. Constant heat techniques, however, cannot be optimized to produce a high nugget diameter to energy ratio because of the nonlinear and dynamic characteristics of the welding process.

Furthermore, constant heat and a number of other welding systems incorporate a probe wire measuring the voltage at the electrodes to determine the resistance of the weld pieces during the weld process. Probe wires, however, often break, thereby stalling the welding process. As these weld guns are used in industrial applications, a broken probe wire can shut down an entire assembly line, which can result in costly production delays. Thus, there is a need for probeless energy delivery control in spot welding processes.

SUMMARY

In some aspects of the disclosure a spot welding system is disclosed. The spot welding system comprises a power supply module configured to generate a first electrical current and a power delivery module configured to receive the first electrical current from the power supply module and to generate a second electrical current from the first electrical current. The spot welding system further comprises a first electrode and a second electrode configured to resistively spot weld at least two weld pieces interposed between the first and second electrode. The first electrode and second electrode receive the second electrical current, which causes the resistance and temperature of the weld pieces to increase such that the weld pieces melt. The system is further comprised of a voltage control module configured to receive a current reading indicating a value of the first electrical current, to estimate a resistance of the weld pieces as a result of the second current flowing through the weld pieces based on the value of the first electrical current, and to determine a phase angle for setting a voltage outputted by the power supply module based on the estimated resistance and a power profile that indicates an amount of power to be delivered by the power delivery module over a period of time, wherein the power supply module generates the first electrical current based on the phase angle.

In some aspects of the disclosure, a method for performing resistance spot welding using a power supply module, a power delivery module, a first electrode and second electrode that receive power from the power delivery module is disclosed. The method comprises interposing at least two weld pieces between the first and second electrodes, generating a first current at the power supply module, and receiving the first current at the power delivery module and generating a second current from the first current. The method further comprises delivering the second current to the first electrode and second electrode, thereby causing the resistance and temperature of the weld pieces to increase such that the weld pieces melt. The method further comprises receiving a current reading indicating a value of the first current, estimating a resistance of the weld pieces as a result of the second current flowing through the weld pieces based on the value of the first current; and determining a phase angle for setting a voltage outputted by the power supply module based on the estimated resistance and a power profile that indicates an amount of power to be delivered by the power delivery module over a period of time. The method further comprises adjusting the voltage of the first current based on the phase angle.

Further areas of applicability of the teachings of the present disclosure will become apparent from the detailed description and the drawings provided hereinafter. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

A system and method for effectuating probeless energy delivery control during resistive spot welding is disclosed herein. The system does not require a probe to provide feedback of the tip-to-tip voltage at the electrodes. As discussed above, resistive spot welding can be performed according to a power profile. A power profile is a model that defines an amount of power to be delivered to the weld pieces over a period of time. Previously, a feedback probe would be placed at the electrodes of a welding gun to determine a voltage across the electrodes so that the dynamic resistance of the weld pieces could be estimated.

The resistive spot welding systems disclosed herein do not require a probe to measure the voltage across the weld pieces.

Figure 1:
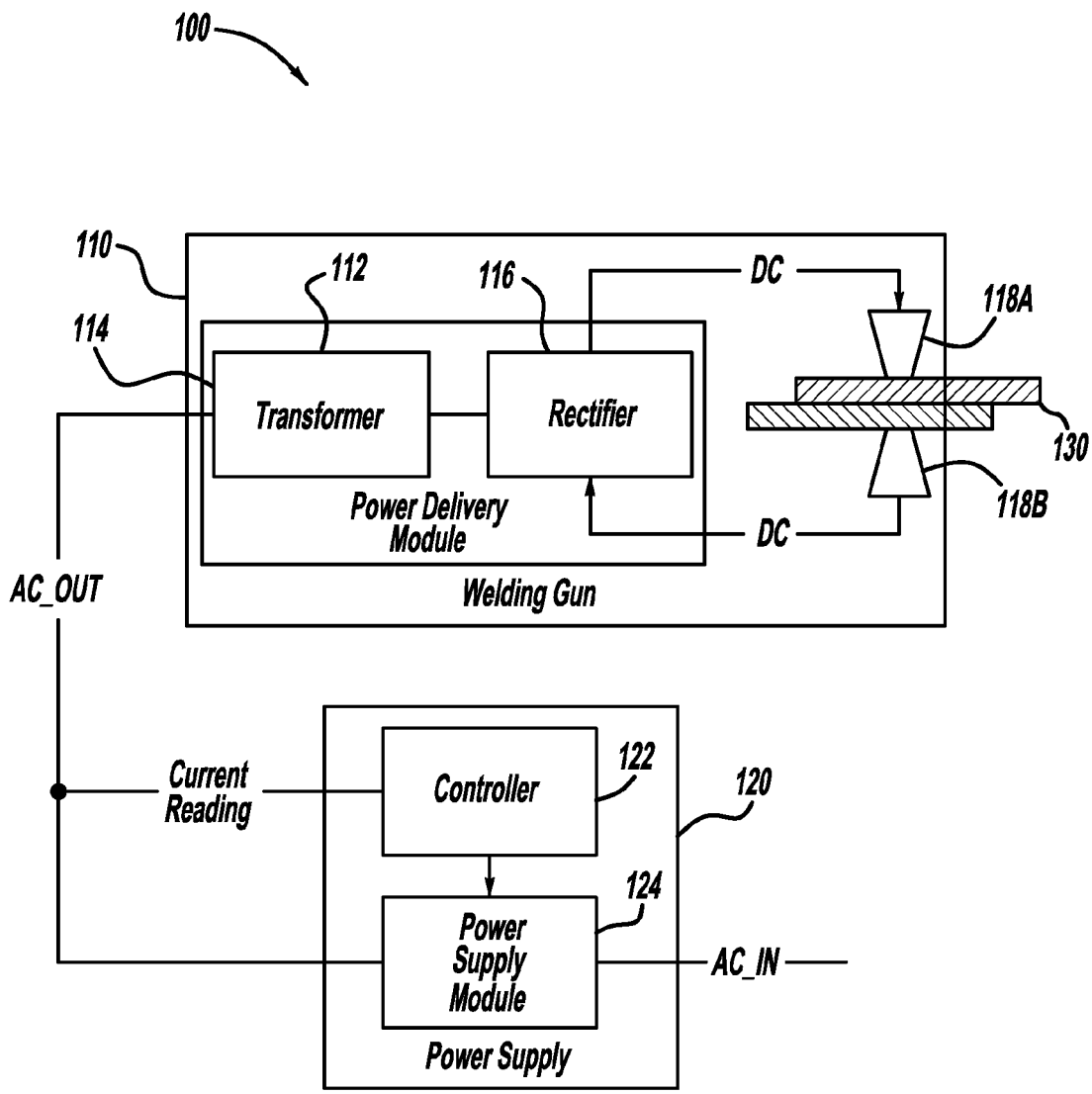
FIG. 1 is a block diagram illustrating an exemplary resistive spot welding system.

FIG. 1 illustrates an exemplary resistive spot welding system 100. The resistive spot welding system 100 is comprised of a weld gun assembly 110 and a power supply 120. The power supply 120 receives an input AC current and delivers an output AC current to the weld gun 110.

The weld gun assembly 110 is comprised of a power delivery module 112, a first electrode 118A and a second electrode 118B. It is noted that in some embodiments the power delivery module 112 may be housed in the weld gun assembly 110, while in some embodiments, the power delivery module 112 may be apart from the weld gun assembly 110. Two or more weld pieces 130 are placed between the electrodes 118A and 118B such that an electrical current is delivered to the first electrode 118A through the weld pieces 130 and to the second electrode 118B. As the current flows through the work pieces 130, the temperature of the weld pieces 130 increases, thereby causing the weld pieces 130 to melt. Soon afterward, the current is taken off and the molten weld material is allowed to cool down. The weld pieces 130 are forcibly pressed against one another, thereby forming a weld nugget at the area where melting had occurred. The welding gun assembly 110 may further include one or more water sources that deliver water to the electrodes 118A and 118B so that the electrodes 118A and 118B do not become too hot during the welding process. Further the welding gun assembly 110 may further include one or more shunts that allow the electrodes 118A and 118B to physically move during the welding process.

The weld gun assembly 110 includes a power delivery module 112. The power delivery module 112 receives the electrical current from the power supply 120 and generates a current to deliver to the first and second electrodes 118A and 118B. In some embodiments the power delivery module 112 is configured to receive an alternating current and to output a direct current to the electrodes 118A and 118B. In these embodiments, the power delivery module 112 may include a transformer 114 and a rectifier 116. In an exemplary embodiment, the transformer 114 is a step down transformer, such that the voltage of the received AC current is decreased and delivered to the rectifier 116. The rectifier receives an alternating current and outputs a direct current which is provided to the electrodes 118A and 118B.

The power supply 120 is comprised of a controller 122 and a power supply module 124. The power supply 120 is configured to output a current to the welding gun sufficient to melt the weld pieces 130 together. The controller 122 is configured to receive data indicative of the physical properties of the weld pieces 130, to determine a power profile for generating power sufficient to melt the weld pieces 130 and to determine a value corresponding to an output voltage that is used by the power supply module 124 to output the current that is provided to the welding gun 110. It is noted that in some embodiments the controller 122 may be configured to receive a power profile from an external source (not shown) instead of receiving data indicative of the materials of the weld pieces 130.

The power supply module 124 is configured to receive the value corresponding to an output voltage from the controller 122 and to deliver an output current that is delivered to the welding gun 110. In some embodiments, the power supply module 124 will deliver an amount of power that corresponds to the calculated phase angle, $\phi$. The phase angle, $\phi$, is determined by the controller 122 and is used to set the amplitude of the outputted AC voltage. The value of the phase angle is determined from the power profile generated by the controller 122.

Figure 2:
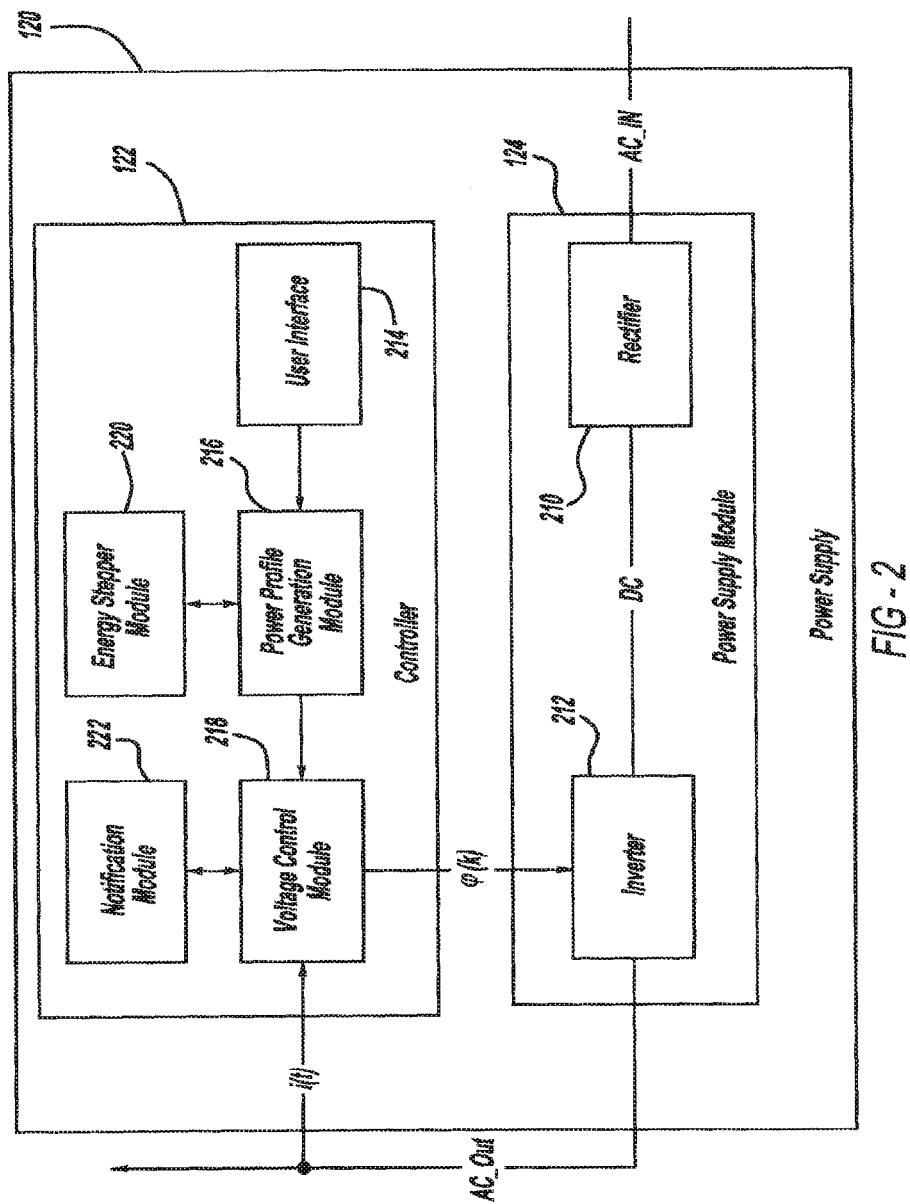
FIG. 2 is a block diagram illustrating exemplary components of a power supply of a resistive spot welding system.

FIG. 2 illustrates the components of an exemplary power supply 120. As previously discussed the power supply includes a controller 122 and a power supply module 124. In an exemplary embodiment, the power supply module 124 receives an input AC current having a first frequency, e.g., 60 hz, and outputs a second AC current having a second frequency, e.g., between 800 hz and 1600 hz. As can be appreciated, the power supply module 124 may output an AC current that has a much greater frequency than the input AC current. For instance, in the example provided the second frequency can be an order of magnitude 10 or more greater than the first frequency. In some embodiments the power supply module 124 is comprised of a rectifier 210 and an inverter 212. It is appreciated that a chopper (not shown) may be used instead of the inverter 212 as both operate to output a current that has the characteristics of an alternating current. For purposes of explanation, the power supply module 124 is described as having an inverter 212, but it is appreciated that a chopper may be substituted for the inverter and may be operated in a similar manner.

The rectifier 210 receives the input AC current and converts the input AC current to a DC current which is transmitted to the inverter 212. The rectifier 210 may be a half wave rectifier or a full wave rectifier and may be further configured to perform output smoothing on the DC current such that a smooth DC current is transmitted to the inverter 212.

The inverter 212 receives a DC current and outputs the output AC current at the second frequency. In an exemplary embodiment, the inverter 212 receives a phase angle from the controller and outputs an AC voltage corresponding to the received phase angle, such that the amplitude of the output AC voltage is dependent upon the received phase angle. The outputted AC voltage is transmitted to the weld gun 110, as described with respect to FIG. 1.

As was previously discussed, the controller 122 is configured to generate or receive a power profile and based on the power profile determine a phase angle to communicate to the inverter 212. In an exemplary embodiment, the controller 122 is comprised of a user interface 214, a power profile generation module 216 and a voltage control module 218.

The user interface 214 is configured to receive material data from a data source, such as a user. The material data may indicate the physical characteristics of the weld pieces. For instance, the material data may include material thickness data indicating thicknesses of a weld pieces and material type data indicating the types of material composing the weld piece.

The controller 120 further includes a power profile generation module 216. The power profile generation module 216 receives the material data and generates a power profile which indicates amounts of instantaneous power required to generate a sufficient amount of energy to melt the weld pieces 130 over a period of time. In some embodiments the power profile generation module 216 generates non-linear power profiles having a discrete step function approximation of the power levels over the period of time. It is appreciated, however, that the power profile generation module 216 may generate any type of power profile, including linear power profiles. Furthermore, it is appreciated that the power profile may be generated on an external device and communicated to the controller 122. For purposes of explanation, the power profile generation module 216 will be described as being part of the controller 122.

The voltage control module 218 receives the power profile and monitors a current being delivered to the weld gun 110. Based on the power profile and the monitored current, the voltage control module 218 can determine the phase angle, which is then communicated to the inverter 212. The voltage control module 218 will monitor the current delivered to the weld gun to estimate a dynamic resistance of the weld piece at a specific time instance. The voltage control module 218 will use the estimated dynamic resistance of the weld pieces 130 to compute a requisite voltage to deliver an optimal amount of power. The optimal amount of power is determined from the power profile. Once the voltage control module 218 determines an optimal output voltage, the voltage control module 218 determines a phase angle corresponding to the determined output voltage. The determined phase angle is then communicated to the inverter 212 of the power supply module 124.

It is noted, that in some embodiments the voltage control module 218 can be further configured to assure that the total energy delivered to the weld nugget is equal to the desired amounts of energy E. In these embodiments, the voltage control module 218 continuously monitors the amount of energy delivered to the weld nugget and adjusts the voltage level outputted by the power supply module 124 to compensate for a difference between the actual energy delivered and the optimal amount of energy to be delivered.

Figure 3:
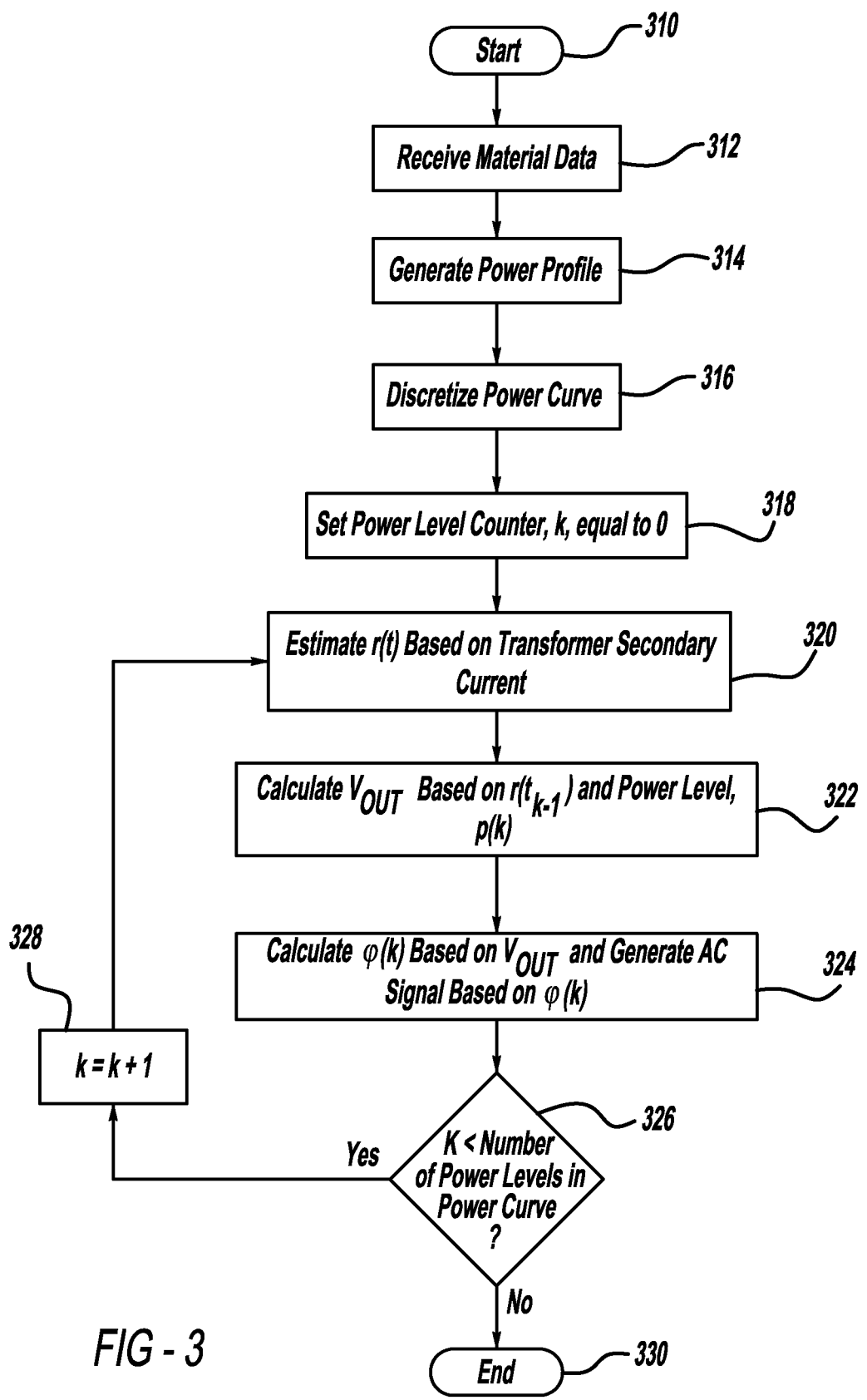
FIG. 3 is a flow chart illustrating an exemplary method for determining a phase angle of a current to be delivered.

FIG. 3 illustrates an exemplary method that can be executed by the controller 122. The method may begin executing with the commencement of a weld job. Using the user interface 214, or other suitable input means, the controller receives the material data of the weld pieces, as shown at step 312. For instance, in an exemplary embodiment, the user interface 214 is configured to allow a user to input material type data and material thickness data for metal materials being welded together using the welding system 100. The user interface 214 may be further configured to receive additional data such as a desired weld nugget size.

Based on the material data, the power profile generation module 216 generates a power profile, as shown at step 314. As discussed above, the power profile is a model that indicates an amount of instantaneous power to deliver to the electrodes 118A and 118B at a particular time instance during a weld period. The weld period is the overall amount of time to weld the two or more weld pieces together. The amount of instantaneous power is calculated from the amount of energy, E, sufficient to melt the weld pieces over the weld period.

The amount of energy, E, sufficient to melt the weld pieces can be determined from the material data. In some embodiments, a look up table (not shown) associated with the power profile generation module 216 may store energy amounts corresponding to different material types and thickness. For each material type/material thickness combination, the look up table may store a corresponding value indicating an optimal amount of energy, E, to form a weld nugget, i.e. the amount of energy needed to melt the weld pieces enough to weld the weld pieces together. It is appreciated that other means of determining E may also be used.

The look up table may further store time values corresponding to the material type/material thickness. The time value indicates a sufficient amount of time required to weld the weld pieces together. In some embodiments, the look up table may also store a time constant, α used to control a rate of decay. It is appreciated that a separate look up table can be used to determine the time value associated with a material type and material thickness. It is noted that another look up table that indicates a requisite amount of force to be applied to the weld pieces to weld the weld pieces together may be maintained as well.

Once the requisite amount of energy, E, and the amount of time to weld the weld pieces are determined, the power profile can be generated. In some embodiments, the power profile generation module 216 generates non-linear power profiles. For instance, one example of a nonlinear power profile is an exponentially decaying power curve, p(t), described by the equation:

$$p(t)=P_0 e^{-\alpha t}, 0 \leq t \leq T,$$  Equation 1 where $P_0$ denotes an amount of instantaneous power to be delivered at the commencement of the weld, i.e., at t=0, α is a time constant that controls the rate of decay of p(t), and T is the total duration of a weld period, i.e., the time value determined based on the material type and material thickness. α can be experimentally determined and stored in a look up table.

As discussed above, E denotes the desired amount of energy to weld the work pieces. The value of E can be obtained by integrating Equation 1 from 0 to T. The integration of Equation 1 yields:

$$E=P_0(1-e^{-\alpha T})/\alpha.$$  Equation 2.

From Equation 2, the value of $P_0$ can be obtained, by solving for $P_0$. Thus, in the foregoing example, $P_0$ can be expressed as:

$$P_0=\alpha E/(1-e^{-\alpha T}).$$  Equation 3.

As E, α, and T are all known values, the power profile generation module 216 can determine the value of $P_0$ from Equation 3. Using $P_0$, α, and T, the power profile generation module can define an exponentially decaying power curve, p(t), by substituting the values of $P_0$, α, and T into equation 1.

While the foregoing example describes the generation of an exponentially decaying power profile, it is appreciated that any suitable power profile may be used. For instance, a linearly decaying power profile can be used in place of a exponentially decaying power profile. Further, predetermined power profiles can be stored in a data store associated with the controller 122, such that a power profile can be looked up using the material type and thickness.

Once the power profile generation module 216 generates a power profile, p(t), the power profile generation module 216 can discretize the power profile, as shown at step 316. In some embodiments the power profile generation module 216 will discretize the power profile by generating a step function that approximates the power profile. The discretized power profile is defined to have N steps, where each step represents a time segment at a fixed power output. The end points of the steps are denoted by the time instances, $t_k$, while $1 \leq k \leq N$. Further the N power levels are denoted by p(k), while $1 \leq k \leq N$. Thus, the discretized power function p(k) can be represented by $$p(k)=p(t_k)$$  Equation 4

Figure 4:
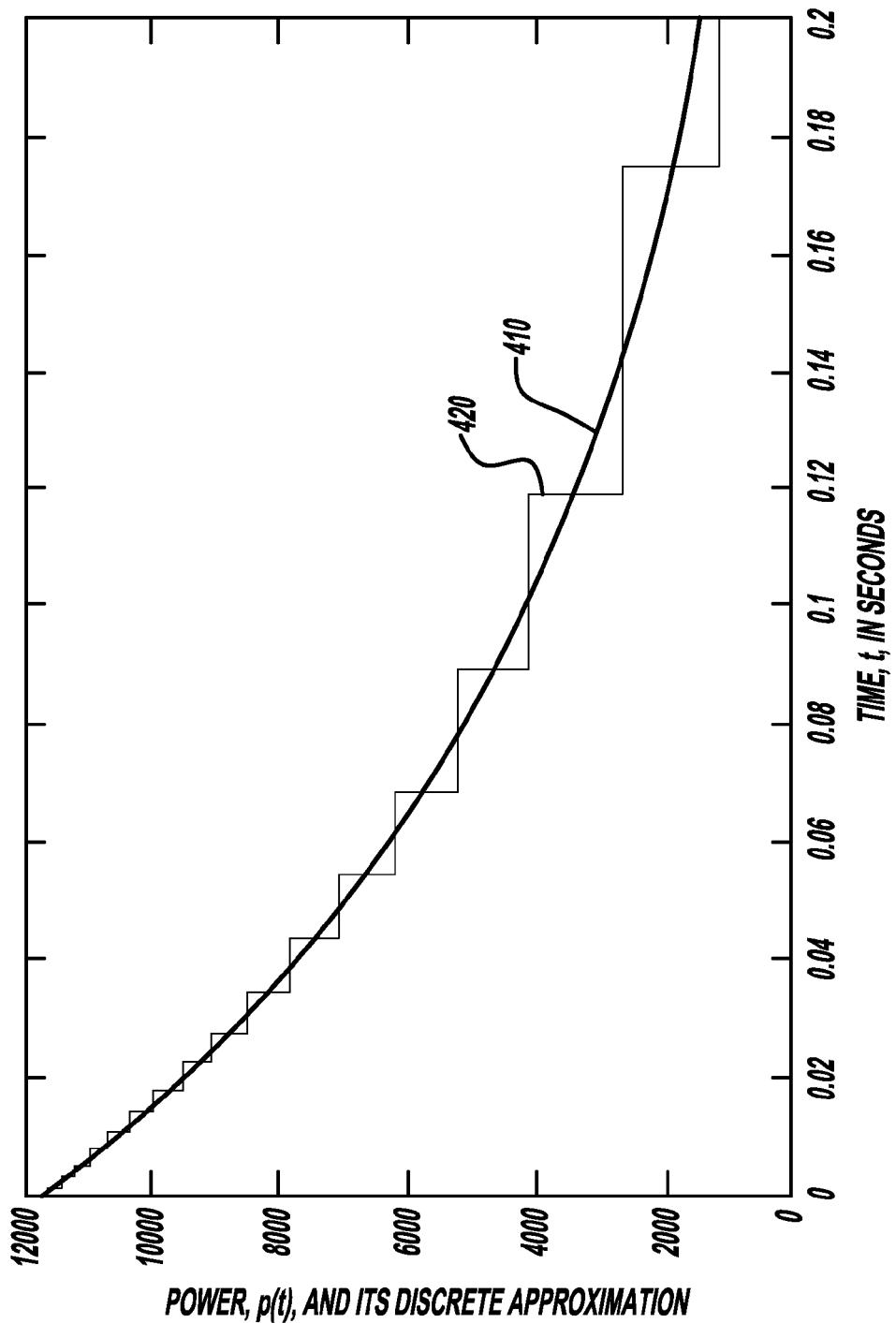
FIG. 4 is a figure illustrating an exemplary power profile of a non-linear power curve and a discretized approximation thereof.

It is noted that the power levels may have equal time durations or may have varying time levels. FIG. 4 illustrates an exemplary power profile 410 and a corresponding discretized power profile 420. As can be observed from FIG. 4, the power profile is an exponentially decaying power profile. The step function approximating the power profile begins at t=0 having relatively short time segments for each power level. As time increases, the duration of each power level of the discretized power profile 420 increases. It is appreciated that other power profiles will have different discretized power profiles. Further, it is noted that the discretized power profile can be modeled in any suitable fashion.

The voltage control module 218 receives a power profile or a discretized power profile and will enter a power delivery loop as shown in steps 318-328. During each iteration of the loop, the voltage control module 218 determines an instantaneous phase angle, φ(k), corresponding to an optimal output voltage of the kth power level, where k is the value of the current iteration. Thus, the voltage control module 218 can initialize a power level counter, k, to zero and begin the power delivery loop, as shown at step 318.

In each iteration of the power delivery loop, the voltage control module 218 will determine a phase angle to communicate to the inverter 212. In order to obtain the phase angle corresponding to the optimal output voltage, the voltage control module 218 uses the following formula:

$$v(t)=C\phi(t)r(t)/[r_g+r(t)] \qquad \text{Equation 5}$$

where v(t) is the optimal output voltage that needs to be delivered to the weld gun 110, C is the characteristic constant of the inverter 212, φ(t) is the instantaneous phase angle at time t, $r_g$ is the resistance of the weld gun 110, and r(t) is the dynamic resistance of the weld pieces. C and $r_g$ are known in advance of the process. As will be discussed below, r(t) can be estimated. To determine the optimal output voltage, the output voltage at time t can be determined from:

$$p(t)=v^2(t)/r(t) \qquad \text{Equation 6}$$

where p(t) is the instantaneous power at time t, as defined in the power profile.

As can be appreciated, to determine the optimal output voltage, the value r(t) must be determined. Because the voltage control module 218 does not receive a feedback voltage measurement from the electrodes 118A and 118B, the voltage control module 218 estimates the resistance of the weld pieces, as shown at step 320. The resistance of the weld pieces can be estimated based on the transformer current, i.e., the current delivered to the power delivery module 112 from the power supply 120 or the current returning from the power delivery module 112 to the power supply 120.

As mentioned, the value of r(t) is equal to the resistance of the weld pieces 130. Furthermore, as the temperature of the weld pieces 130 will vary as time varies, so will the resistance of the weld pieces 130. The resistance of the weld gun, $r_g$, is nearly constant and can be determined during a calibration period, as will be discussed below. As the weld pieces are arranged in series with the weld gun arms, the resistance of the weld gun, including the weld pieces, can be represented by: $r_g+r(t)$. Thus, the voltage control module 218 can estimate the value of $r_{total}(t)=r_g+r(t)$ by monitoring the current flowing to or from the power delivery module 112 as well as the voltage delivered by the power delivery module 112.

As was discussed, the resistance of the weld gun arms, $r_g$, can be determined during a calibration phase. During the calibration phase, the electrodes 118A and 118B can be closed without a weld piece interposed there-between, and a small current of predetermined value can be delivered to the weld gun. As the current is known, and the voltage across the weld gun can be measured, the resistance $r_g$ can be solved for using $V_g/I=r_g$. Calibration phases can occur at regular or irregular intervals when the weld gun is not in use. The value of $r_g$ can be stored in a memory associated with the controller 122. It is appreciated that the value of r(t) can be obtained by subtracting $r_g$ from $r_{total}(t)$.

The following illustrates how the voltage control module 218 determines the dynamic resistance r(t). At each time instance $t_k$, which were defined earlier, the voltage across the secondary coil of the transformer, $v(t_k)$, can be modeled by:

$$v(t_k)=r_{total}(t_k)i(t_k), \quad 1 \leq k \leq N, \qquad \text{Equation 7}$$

Thus, if the values $v(t_k)$ and $i(t_k)$ are known, the value $r_{total}(t_k)$ from Equation 7 can be calculated, which can be used to obtain the dynamic resistance $r(t_k)$ define by:

$$r(t_k)=r_{total}(t_k)-r_g \qquad \text{Equation 8}$$

because $r_g$ is assumed to remain unchanged from $t_{k-1}$ to $t_k$. However, at time $t_k$, only the values of $v(t_{k-1})$ and $i(t_{k-1})$ from the previous time segment are known. Thus, an estimate of $r(t_{k-1})$ can be obtained from Equations 7 and 8. Assuming r(t) to be a slowly time-varying function, which usually holds in practice, the estimated value of $r(t_{k-1})$ can be assumed to be a good approximation of $r(t_k)$ and used to calculate the desired value of $v(t_k)$ from Equation 6, as explained below.

Once the resistance of the weld pieces is determined, the voltage control module 218 can determine the optimal output voltage for the kth power level, as shown at step 322. The optimal output voltage is the voltage that is delivered to transformer 112 from the power supply 120. For each power level, the voltage control module 218 will determine the value of r(t) and $r_g+r(t)$ prior to determining the optimal voltage output, v(k), where k is the current power level. Thus, when the voltage control module 218 is determining the value of v(k) the value of r(t) corresponds to the resistance resulting from the voltage setting of the previous iteration, i.e., $r(t_{k-1})$. The optimal output voltage, v(k), can be solved for using the following equation:

$$p(k)=v^2(k)/r(t_{k-1}) \qquad \text{Equation 9.}$$

The value of p(k) can be determined from the power profile, where p(k) is the optimal power output at the kth power level.

Once the optimal output voltage v(k) is determined, the instantaneous phase angle φ(k) can be determined, as shown at step 324. The instantaneous phase angle φ(k) can be solved for using the following equation:

$$v(k)=C\phi(k)r(t_{k-1})/[r_g+r(t_{k-1})] \qquad \text{Equation 10.}$$

By solving for the instantaneous phase angle φ(k), the voltage control module 218 has determined the phase angle that may result in the delivery of the optimal power output defined by the power profile. Thus, the instantaneous phase angle φ(k) is communicated to the inverter 212. The inverter 212 sets the phase angle equal to the received phase angle, φ. This results in a constant voltage, v(k) being supplied to the electrodes 118A and 118B.

The voltage control module 218 can maintain the constant phase angle for the duration of the kth power level. For instance, if the kth power level has a duration of 0.005 seconds, then the voltage control module 218 will maintain the phase angle, φ(k), for 0.005 seconds and then determine if there are more power levels remaining, as shown at step 326. Namely, the voltage control module 218 will check if k<N. If k<N, then k is incremented and the voltage control module 218 will determine the instantaneous phase angle of the (k+1)th power level, as shown at step 328. If k=N, then the weld of the weld pieces 130 is complete, as shown at step 330. It is appreciated that the power delivery loop may be performed for multiple weld pieces in succession without having to determine a new power profile.

It is appreciated that as the weld system is used, the electrodes 118A and 118B may become coated with debris from the melted weld pieces. As the electrodes become coated with debris, the resistance of the weld gun, rg, will increase. As the resistance of the weld gun grows, the amount of power needed to be delivered to the electrodes 118A and 118B will also increase. Thus, in some embodiments, the controller 122 may further include an energy stepper module 220 that is configured to monitor the long term trends of the resistance of the weld guns, $r_g$. The energy stepper module 220 will update the look up tables indicating amounts of energy required to weld the weld pieces according to the trends in the resistance.

The controller 122 can further monitor the weld process to determine if there is evidence of expulsion. If the controller 122 detects that expulsion is occurring, the controller 122 will estimate the resulting nugget diameter. Expulsion is a burst of molten metal resulting from the molten metal extending out of the weld zone. Expulsion can lead to a thinner and weaker weld. Expulsion occurs, for example, if the temperature of the weld pieces becomes too high, if too much force is applied to the weld pieces, or the weld pieces are too conductive. Based on the nugget diameter of the weld, the controller 122 can update the energy levels or weld times to increase the weld efficiency. The controller 122 can continuously monitor the nugget diameters to update the optimal weld parameter settings for different material types and thicknesses.

Figure 5:
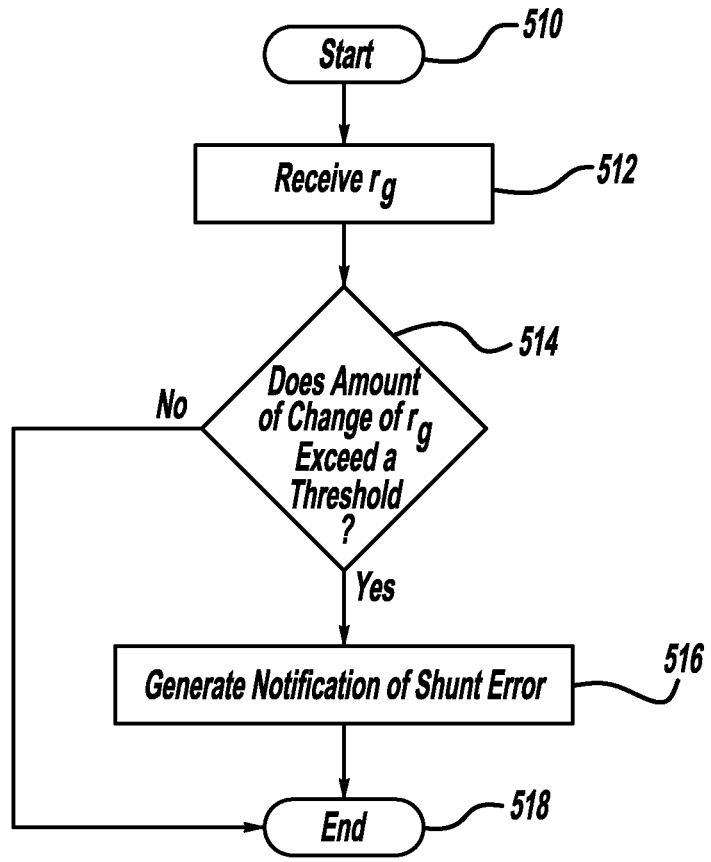
FIG. 5 is a flow chart illustrating an exemplary method for monitoring the condition of a water shunt based on a resistance of a weld gun.

Moreover, the controller 122 can monitor the condition of the water source used to cool the weld gun 110 with water and the shunts by monitoring the resistance of the weld gun. The controller 122 can monitor the resistance of the weld gun 110, $r_g$, to determine if the water source used to cool the weld gun or one or more shunts are in an error state. The controller 122 may include a notification module 222 that determines if an abrupt rise in the weld gun resistance is observed. FIG. 5 illustrates an exemplary method that may be executed by the notification module 222. As mentioned above, the voltage control module 218 will determine a resistance of the weld gun arms, $r_g$. Thus, the notification module 222 will receive the resistance $r_g$ from the voltage monitoring module, as shown at step 512. The notification module 222 will compare the received resistance with a previously received resistance value in a previous calibration phase, as shown at step 514. If the received resistance is much greater than the previous resistance, than the notification module 222 will issue a notification, as shown at step 516. For example, if the measured resistance is greater than the previous resistance by a factor of two or more, then the notification will be issued. The notification may include a light or alarm indicating to a user that the shunt or water source has been damaged. If the measured resistance is not much greater than the previous resistance, then the method stops executing, as shown at step 518.

It is noted that in some embodiments the notification module 222 can monitor the current during the calibration phase to determine if a shunt or water flow is in an error state. In these embodiments, the notification module 222 compares a measured current during the calibration phase with an expected current. The expected current corresponds to an expected resistance or a previous resistance. A large difference between the measured current and the expected current indicates weakening or breakage of the water shunts. In such a scenario, a notification is issued to the user.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

What is claimed is:

1. A spot welding system comprising:
 a power supply module configured to generate a first current;
 a power delivery module configured to receive the first current from the power supply module and to generate a second current from the first current;
 a first electrode and a second electrode configured to resistively spot weld at least two weld pieces interposed between the first and second electrode by receiving the second current, thereby causing the resistance and temperature of the weld pieces to increase such that the weld pieces melt; and
 a voltage control module configured to receive a current reading indicating a value of the first current, estimate a resistance of the weld pieces as a result of the second current flowing through the weld pieces based on the value of the first current and independent of a voltage difference across the first and second electrodes, and determine a phase angle value for setting a voltage outputted by the power supply module based on the estimated resistance and a power profile that indicates an amount of power to be delivered by the power delivery module over a period of time, wherein the power supply module adjusts the first current based on the determined phase angle value.

2. The spot welding system of claim 1 wherein the spot welding system performs probeless energy delivery control such that the voltage across the first and second electrodes is not monitored.

3. The spot welding system of claim 1 wherein the power supply module includes:
 a first rectifier for receiving an input alternating current having a first frequency and outputting a direct current; and
 an inverter that is electrically connected to the first rectifier for receiving the direct current from the first rectifier, wherein the inverter outputs the first current at a second frequency that is at least 10 times greater in magnitude than the first frequency of the input alternating current.

4. The spot welding system of claim 3 wherein the power delivery module includes:
 a step down transformer that is electrically connected to the inverter for receiving the first current from the inverter, wherein the step down transformer lowers the voltage of the first current; and
 a second rectifier electrically connected to the step down transformer for receiving the first current from the step down transformer, wherein the second rectifier outputs the second current as a direct current that delivers an amount of power indicated by the power profile.

5. The spot welding system of claim 1 further comprising a power profile generation module that receives material data indicating physical characteristics of the weld pieces and generates the power profile based on the material data.

6. The spot welding system of claim 5 wherein the power profile generation module determines an amount of energy sufficient to weld the weld pieces together and determines amount of instantaneous power to deliver at a plurality of different points in time spanning the period of time.

7. The spot welding system of claim 1 further comprising an energy stepper module that monitors a total resistance of the power delivery module and the first and second electrodes, compares the total resistance with previously measured resistances, and adjusts the amount of energy sufficient to weld the weld pieces together based on the comparison.

8. The spot welding system of claim 1 wherein the voltage control module determines phase angle according to:

$$v(t_n) = C\phi(t_n) r(t_{n-1}) / [r_g + r(t_{n-1})]$$

where v(t) is a voltage delivered to a rectifier of the power delivery module at a time t, C is a characteristic constant of an inverter in the power supply module, $\phi(t)$ is the instantaneous phase angle at time t, $r_g$ is the resistance of the power delivery module and the first and second electrodes, and $r(t_{n-1})$ is the estimated resistance of the weld pieces at a time $t_{n-1}$, where the time $t_{n-1}$ corresponds to a previous iteration.

9. The spot welding system of claim 8 wherein the voltage delivered to the power delivery module is determined according to:

$$p(t) = v^2(t) / r(t)$$

where p(t) is determined from the power profile.

10. The spot welding system of claim 1 further comprising:
a notification module that monitors a total resistance of the power delivery module and the electrodes during a calibration phase, that compares the total resistance with a previous resistance measured during a previous calibration phase, and that generates an error notification when the difference between the total resistance and the previous resistance exceeds a predetermined threshold, wherein during the calibration phase the first electrode is physically connected to the second electrode without a weld piece interposed between the first electrode and the second electrode and a predetermined voltage is delivered to the first and second electrode.

11. The spot welding system of claim 1 wherein the voltage control module estimates the resistance of the weld pieces according to:

$$r(t_k) = r_{total}(t_k) - r_g$$

where $r(t_k)$ is the resistance of the weld pieces at time $t_k$, $r_g$ is a calibrated resistance of the first and second electrodes, and $r_{total}(t_k)$ is calculated according to:

$$v(t_k) = r_{total}(t_k) i(t_k)$$

where $v(t_k)$ is voltage across a transformer of the power delivery module at time $t_k$, and $i(t_k)$ the first current generated by the power supply module at time $t_k$.

* * * * *